United States Patent
Moratz

(10) Patent No.: US 9,746,031 B2
(45) Date of Patent: Aug. 29, 2017

(54) BEARING CAGE WITH ACTIVE LUBRICATION

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 21 days.

(21) Appl. No.: 14/807,358

(22) Filed: Jul. 23, 2015

(65) Prior Publication Data

US 2016/0069393 A1    Mar. 10, 2016

Related U.S. Application Data

(60) Provisional application No. 62/048,468, filed on Sep. 10, 2014.

(51) Int. Cl.
*F16C 19/00*    (2006.01)
*F16C 33/66*    (2006.01)
(Continued)

(52) U.S. Cl.
CPC ...... *F16C 33/6696* (2013.01); *F16C 33/3887* (2013.01); *F16C 19/06* (2013.01); *F16C 33/3831* (2013.01)

(58) Field of Classification Search
CPC .............. F16C 33/3831; F16C 33/3837; F16C 33/6611; F16C 33/6648; F16C 33/6696;
(Continued)

(56) References Cited

U.S. PATENT DOCUMENTS 5,249,872 A * 10/1993 Rhodes ................... F16C 19/26
384/574
5,356,227 A    10/1994 Sibley et al.
(Continued)

FOREIGN PATENT DOCUMENTS

| KR | 200323549 Y1 | 8/2003 |
|---|---|---|
| WO | 2011057654 A1 | 5/2011 |

OTHER PUBLICATIONS

Barden Precision Cages for Spindle, Turbine, Miniature and Instrument Ball Bearings; Barden Precision Bearings; The Barden Corporation, A Member of the Schaeffler Group; 200 Park Avenue, P.O. Box 2449, Danbury CT 06813-2449, www.bardenbearings.com, Dec. 2010.

(Continued)

*Primary Examiner* — James Pilkington
(74) *Attorney, Agent, or Firm* — Simpson & Simpson, PLLC

(57) ABSTRACT

A cage assembly for a bearing including a main body having a plurality of pockets arranged therein, the pockets operatively arranged to hold a plurality of rolling elements, a plurality of first lubrication elements retained within the main body and operatively arranged to contact the rolling elements, a plurality of second lubrication elements substantially similar to the first lubrication elements, arranged diametrically opposite from the first lubrication elements within the main body to contact the rolling elements and a plurality of pre-load members arranged within the main body to compress the first and second pluralities of lubrication elements against the rolling elements.

20 Claims, 16 Drawing Sheets

(51) Int. Cl.
*F16C 33/38* (2006.01)
*F16C 19/06* (2006.01)

(58) Field of Classification Search
CPC ... F16C 33/3887; F16C 33/66968; F16C 33/38; F16C 33/3862; F16C 33/3868; F16C 33/3875; F16C 33/467; F16C 33/4676; F16C 33/4694
USPC ................................ 384/526, 579, 614, 623
See application file for complete search history.

(56) References Cited

U.S. PATENT DOCUMENTS

| | | | |
|---|---|---|---|
| 6,102,576 A * | 8/2000 | Toyota | F16C 33/32 384/492 |
| 6,471,408 B1 | 10/2002 | Ikeda et al. | |
| 6,616,336 B1 * | 9/2003 | Sayles | F16C 33/38 384/300 |
| 6,749,343 B2 * | 6/2004 | Kato | F16C 19/10 384/614 |
| 2004/0028306 A1 | 2/2004 | Kern et al. | |
| 2010/0195948 A1 | 8/2010 | Perkinson et al. | |
| 2012/0219247 A1 | 8/2012 | Bettenhausen et al. | |

OTHER PUBLICATIONS

Tribology Systems Incorporated *TSI* Patented Self-Film-Replenishing Solid-Lubricated Bearings; 239K Madison Ave., Warminster PA 18974; www.tribologysystems.com; Tribology Consultants, 2005.

Lewis Sibly, Tribology Systems, Inc,; Bala R. Nair, Curtiss-Wright Electro-Mechanical Corporation; Commercial Spool Pump Bearing Performance Testing; Proceedings of WTC2005; World Trebology Congress III, Sep. 12-16, 2005, Washington, D.C., USA; WTC2005-63282, 2005.

* cited by examiner

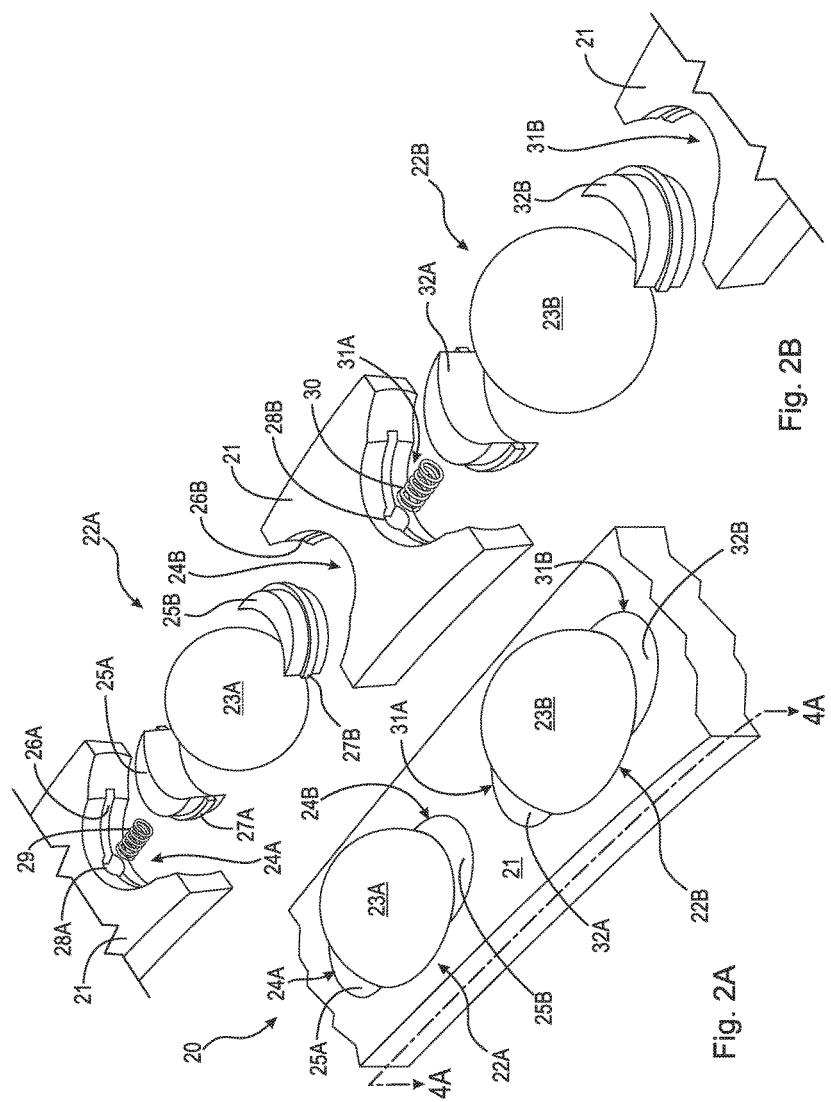

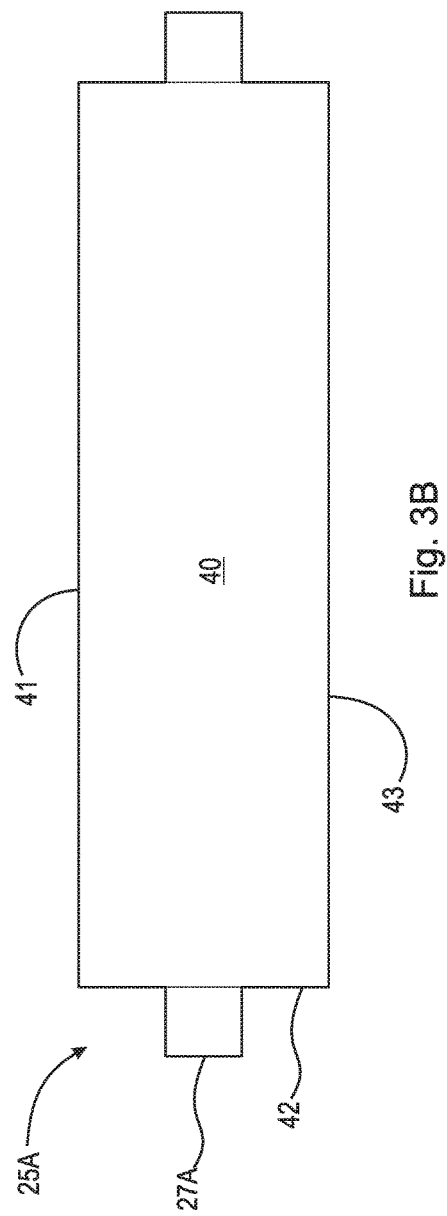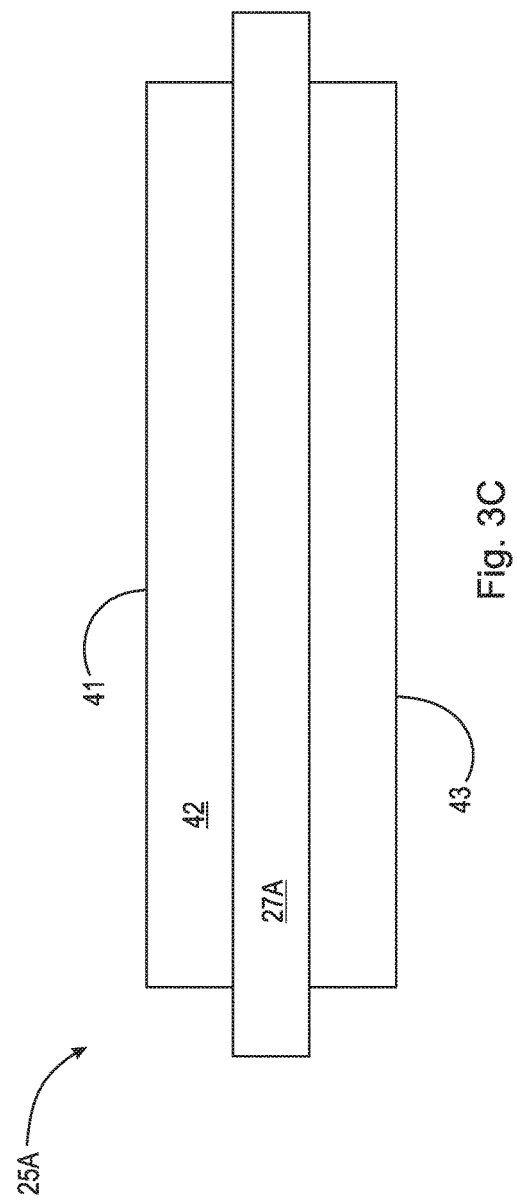

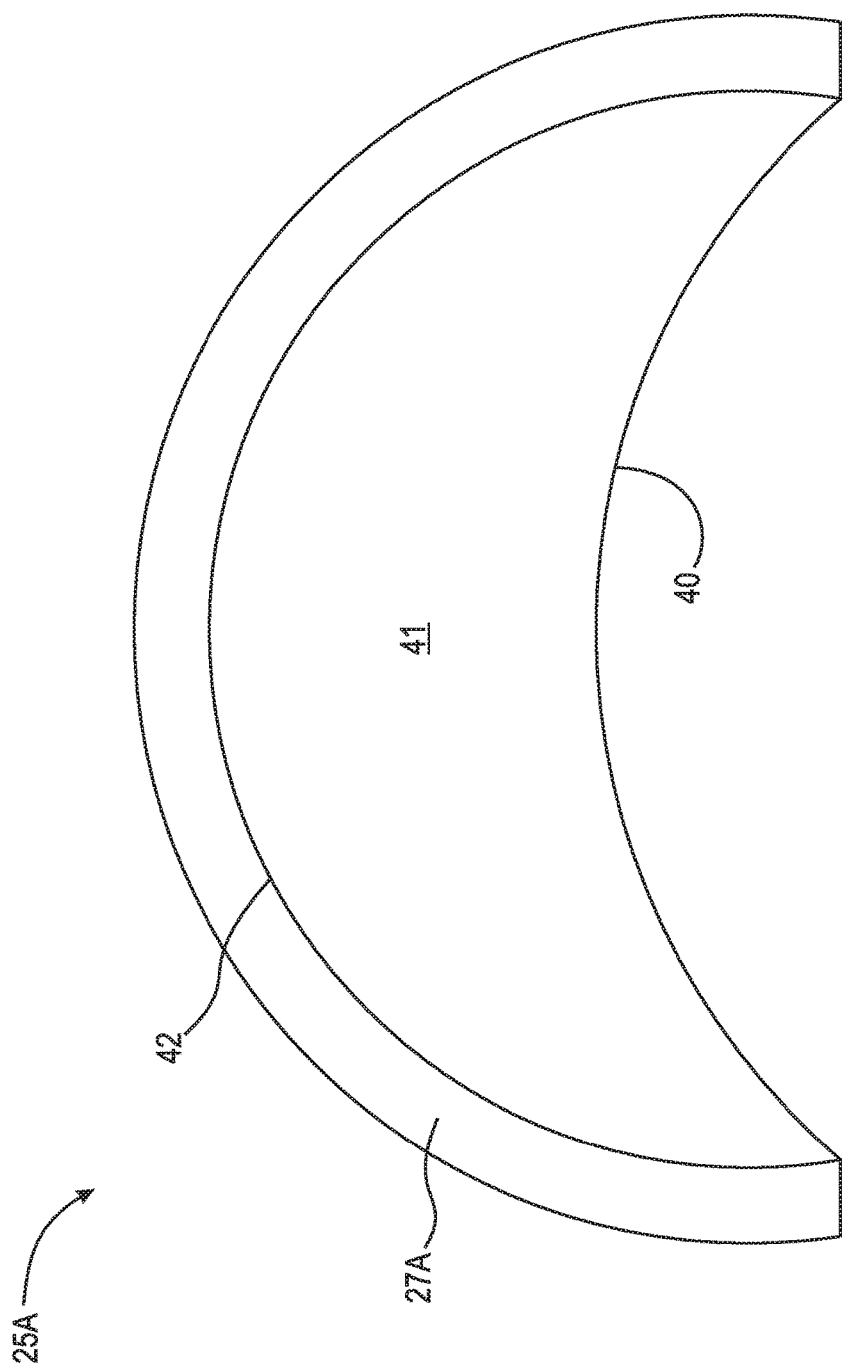

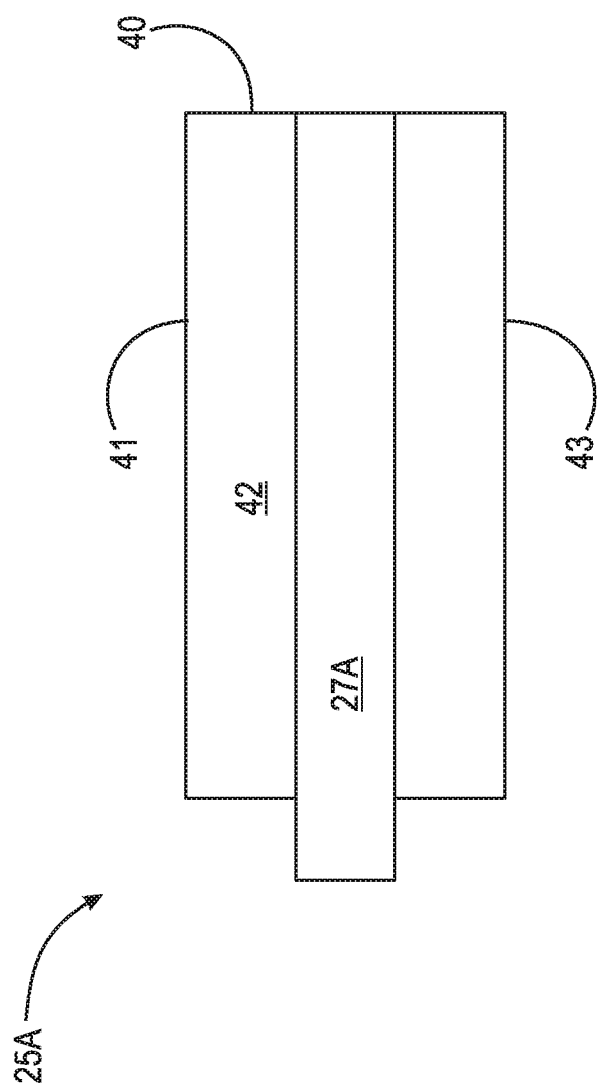

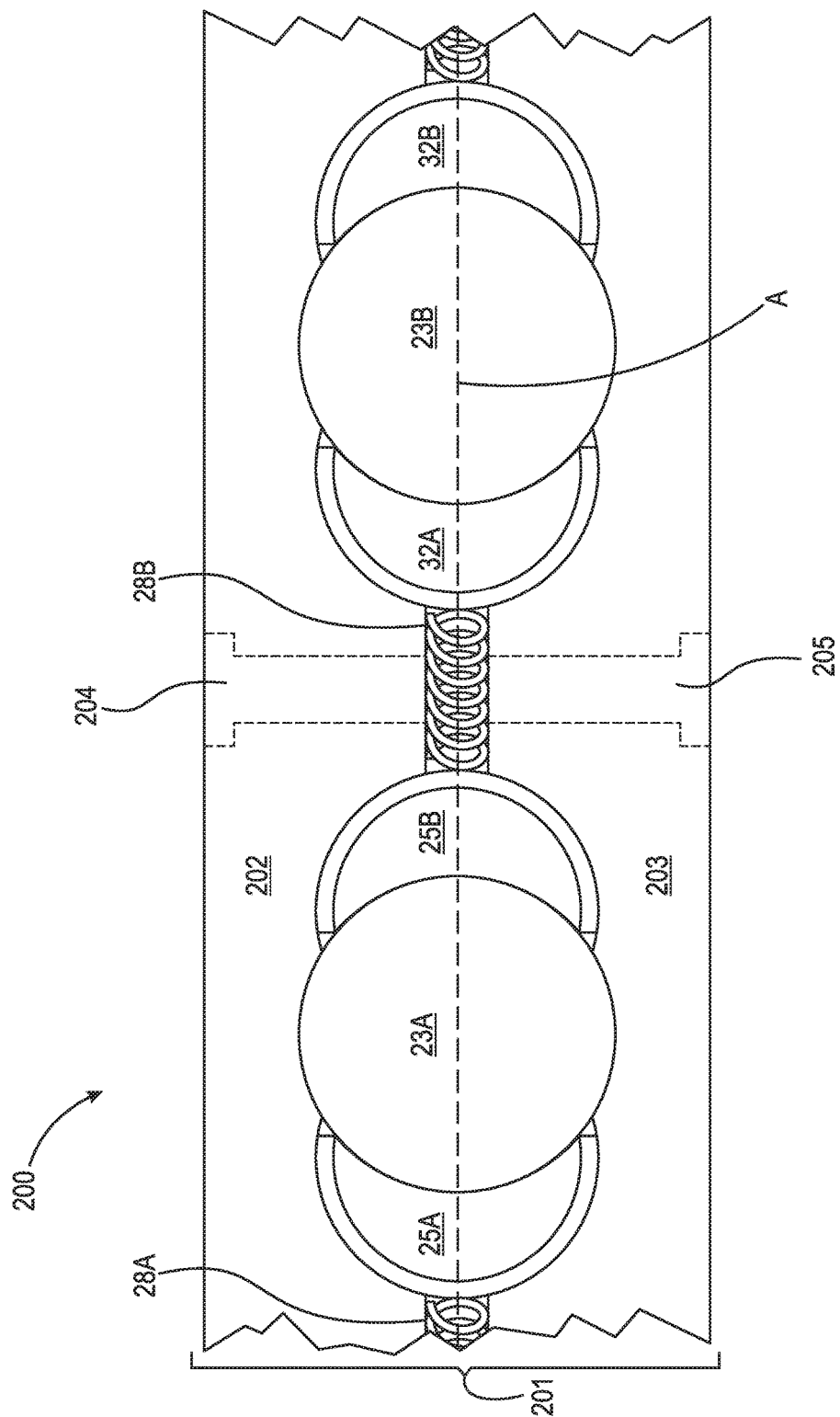

BEARING CAGE WITH ACTIVE LUBRICATION

CROSS-REFERENCE TO RELATED APPLICATIONS

This application claims the benefit under 35 U.S.C. §119 (e) of U.S. Provisional Patent Application No. 62/048,468, filed Sep. 10, 2014, which application is incorporated herein by reference in its entirety.

TECHNICAL FIELD

The present disclosure relates generally to bearings, and, more particularly, to bearings having active lubrication.

BACKGROUND

Conventional lubricants, such as oil or grease, in bearings that are used in extreme or dry environments can deteriorate quickly. In low temperatures, conventional lubricants can cause higher friction torque. In a vacuum, conventional lubricants can out-gas. Others have attempted to provide dry lubricants for bearings.

The Barden Corporation, 200 Park Avenue, Danbury, Conn. discloses a dry-film lubricant. The dry-film lubricant is integrated within the cage. As the bearing rotates, small amounts of the lubricant from the cage are deposited onto the ball bearings and the raceways.

Another lubricant is disclosed by SKF, 890 Forty Foot Road, Lansdale, Pa. The lubricant is based on graphite, molybdenum disulfide ($MoS_2$) and a resin binder. The lubricant is injected into the free space of the bearing and cured until it solidifies. The dry lubricant maintains a very thin film on the raceways and rolling elements to avoid metal-to-metal contact and to protect against damage from solid contaminants.

U.S. Pat. No. 5,356,227 (Sibley et al.) discloses a solid-lubricated bearing assembly including an outer bearing ring, an inner bearing ring, a cage and a plurality of balls arranged within pockets in the cage. The lubricating member is preferably carbon graphite and leaves a thin graphite lubricating film on the assembly. The lubricating member disclosed is an insert arranged within the interior surface of the cage pockets.

International Patent Application No. WO 2011 057654 (SKF A F, et al.) discloses a bearing assembly with active oil lubrication; the bearing assembly includes at least one rolling element bearing and at least one lubrication device. The rolling element bearing includes an inner ring, an outer ring and at least one set of rolling elements disposed within a cavity of the bearing on opposing inner and outer raceways. The lubrication device includes an oil reservoir and a pump drive mechanism. The pump drive mechanism is an electro-osmotic member which pumps a drive fluid, whereby the drive fluid exerts pressure on an oil reservoir in order to effect a supply of oil to the rolling contact zone.

These disclosures do not provide a dry lubricant for a bearing cage where the dry lubricant is embedded within the cage and operatively arranged to actively press against the rolling elements and lubricate them.

Thus, there has been a long-felt need for an improved dry lubrication means for bearings which increases the life of the bearing.

SUMMARY

According to aspects illustrated herein, there is provided a cage assembly for a bearing including a main body, the main body having a plurality of pockets arranged circumferentially about the main body, the pockets operatively arranged to hold a plurality of rolling elements and a plurality of lubrication elements, each of the lubrication elements retained within a pocket of the plurality of pockets and operatively arranged to contact a rolling element.

According to aspects illustrated herein, there is provided a cage assembly for a bearing including a main body having a plurality of pockets arranged therein, the pockets operatively arranged to hold a plurality of rolling elements, a plurality of first lubrication elements retained within the main body and operatively arranged to contact the rolling elements, a plurality of second lubrication elements substantially similar to the first lubrication elements, arranged diametrically opposite from the first lubrication elements within the main body to contact the rolling elements and a plurality of pre-load members arranged within the main body to compress the first and second pluralities of lubrication elements against the rolling elements.

Additionally, the invention is a bearing including an inner ring, an outer ring and a cage assembly arranged between the inner and outer rings, the cage assembly including a main body having a plurality of pockets arranged therein, the pockets operatively arranged to hold a plurality of rolling elements, a plurality of first lubrication elements retained within the main body and operatively arranged to contact the rolling elements, a plurality of second lubrication elements substantially similar to the first lubrication elements retained within the main body to contact the rolling elements and a plurality of pre-load members arranged within the main body to compress the first and second pluralities of lubrication elements against the rolling elements.

These and other objects, features and advantages of the present invention will become readily apparent upon a review of the following detailed description of the invention, in view of the drawings and appended claims.

BRIEF DESCRIPTION OF THE DRAWINGS

The nature and mode of operation of the present disclosure will now be more fully described in the following detailed description of the disclosure taken with the accompanying figures, in which:

FIG. 2A is a perspective view of a cage assembly of the invention;

FIG. 2B is an exploded perspective view of the cage shown in FIG. 2A;

FIG. 3B is a front elevational view of the lubrication element shown in FIG. 3A;

FIG. 3C is a rear elevational view of the lubrication element shown in FIG. 3A;

FIG. 3D is top down view of the lubrication element shown in FIG. 3A;

FIG. 3E is a side view of the lubrication element shown in FIG. 3A;

FIG. 6A is a top down cross-sectional view of another embodiment of the cage assembly of the invention;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure. The assembly of the present disclosure could be driven by hydraulics, electronics, and/or pneumatics.

Figure 1:
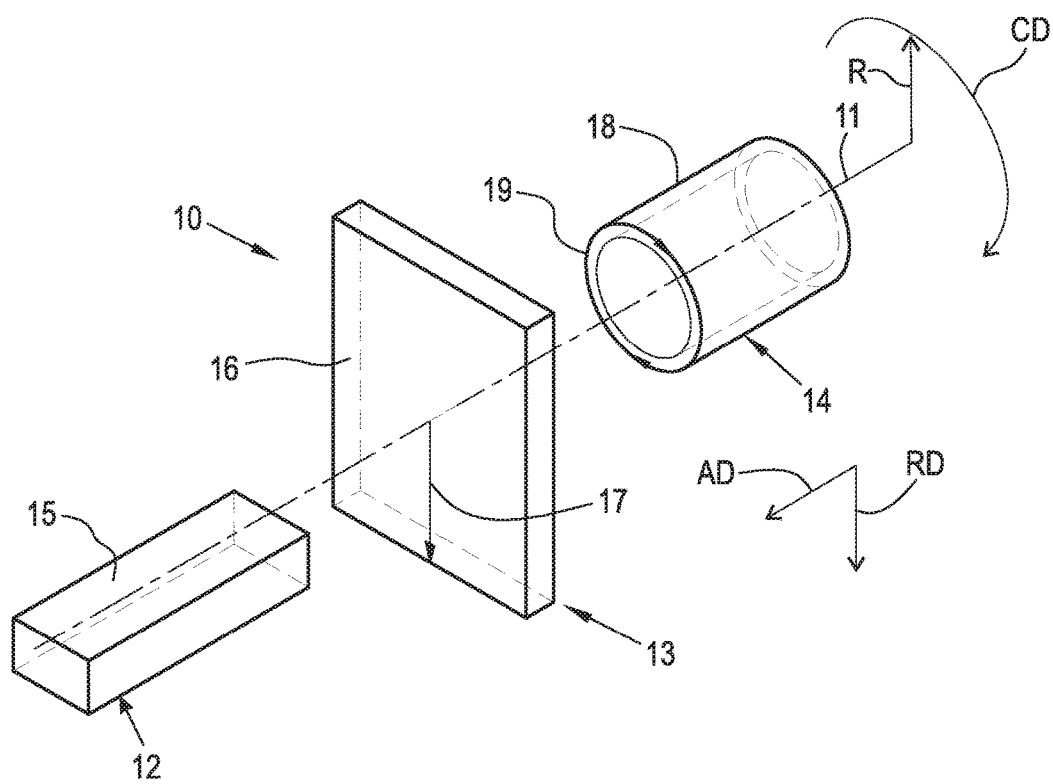
FIG. 1 is a perspective view of a cylindrical coordinate system demonstrating spatial terminology used in the present application.
Figure 3A:
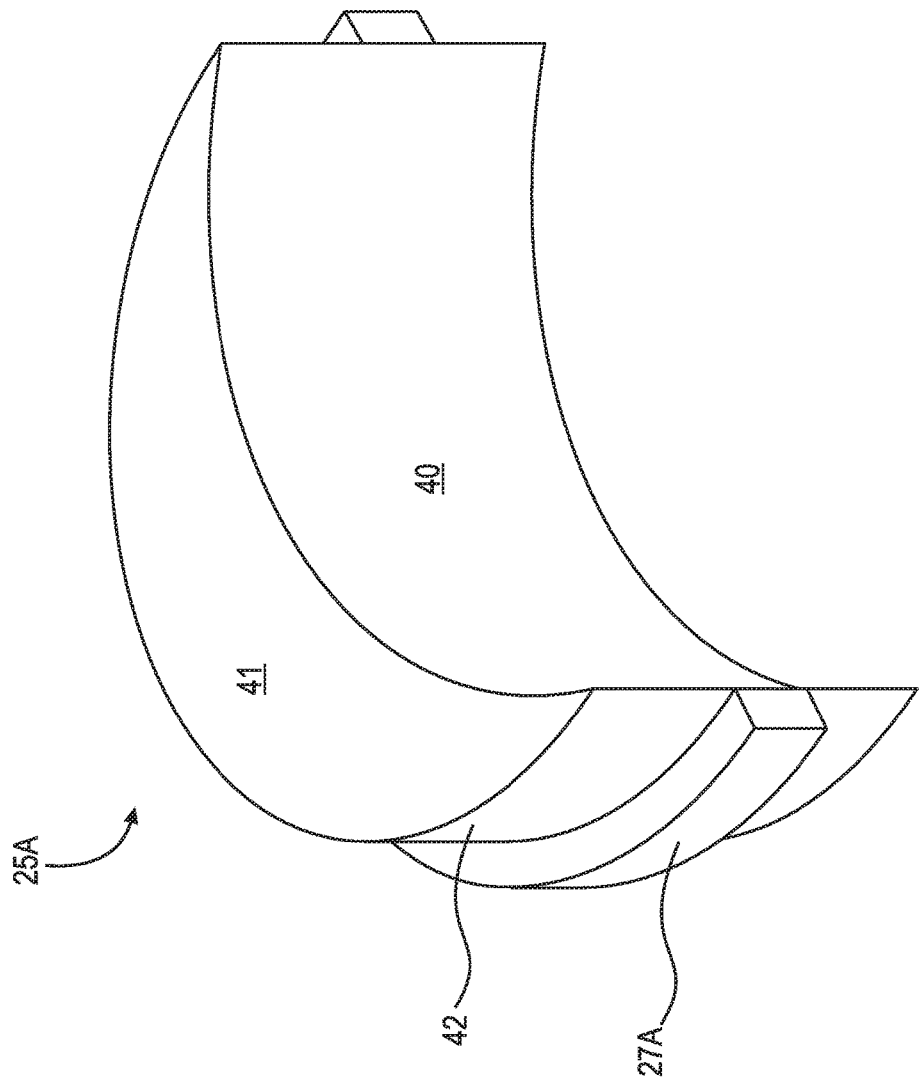
FIG. 3A is a perspective view of the lubrication element of the invention.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Cage assembly 20 is shown in FIG. 2A. Cage assembly 20 broadly includes main body 21 and plurality of pockets 22A, 22B where each pocket is operatively arranged to hold plurality of rolling elements 23A, 23B, respectively. It should be appreciated that plurality of pockets 22A, 22B are substantially similar within cage assembly 20 and that the discussion with respect to a single pocket applies to all pockets within cage assembly 20. At least one sub-pocket 24A is arranged within pocket 22A of cage assembly 20. Sub-pocket 24A is operatively arranged to hold insert 25A. The term sub-pocket is used herein interchangeably with the term recess. It should be appreciated that insert 25A is made of a solid lubricant. For example, insert 25A can be made of molybdenum disulfide ($MoS_2$) or graphite. Alternatively, insert 25A can be made of polytetrafluoroethylene (PTFE), polyamide-imide polymer, or any suitable alternative that is capable of absorbing oil. The term insert is used herein interchangeably with the term lubrication element. In a preferred embodiment, pocket 22A includes two sub-pockets 24A and 24B and two inserts 25A and 25B, respectively. Sub-pockets 24A and 24B and inserts 25A and 25B are arranged to surround rolling element 23A. In a preferred embodiment, sub-pocket 24A is diametrically opposed to sub-pocket 24B and insert 25A is diametrically opposed to insert 25B.

Pocket 22B is operatively arranged to hold rolling element 23B. Pocket 22B includes recesses 31A and 31B (or sub-pockets) and inserts 32A and 32B (or lubrication elements). In a preferred embodiment, inserts 25A, 25B, 32A and 32B are preloaded against rolling elements 23A and 23B, respectively.

As shown in FIG. 2B, in a preferred embodiment, sub-pocket 24A includes groove 26A and insert 25A includes lip 27A. The term lip is used herein interchangeably with the term protrusion. Groove 26A is correspondingly shaped to receive and guide lip 27A. Sub-pocket 24B includes groove 26B and insert 25B includes lip 27B. In an example embodiment, cage assembly 20 further includes through bores 28A and 28B within main body 21. In an example embodiment, through bore 28B connects pocket 24A to pocket 24B. In a preferred embodiment, through bore 28A overlaps groove 26A. Spring 29 is operatively arranged to fit within through bore 28A and provide force against insert 25A. Spring 30 is operatively arranged to fit within through bore 28B and provide force against inserts 25B and 32A. Inserts 25A and 25B are compressed against rolling elements 23A and 23B via springs 29 and 30. Preferably, through bores 28A and 28B are drilled tunnels within main body 21 of cage assembly 20. It should be appreciated that springs 29 and 30 can be made of any suitable metal or rubber. It should be appreciated that since inserts 25A and 25B are compressed against rolling element 23A, an increase in torque or frictional drag can result. However, some bearings are arranged to rotate slowly and do not require low torque. Thus, cage assembly 20 can be particularly advantageous for such bearings that rotate slowly and do not require such low torque. It should be appreciated that depending on the strength of the pre-load members (springs 29 and 30), the amount of torque or frictional drag will vary. If springs 29 and 30 are weak, the amount of torque is less. Alternatively, if springs 29 and 30 are strong, the amount of torque is increased. In a preferred embodiment, the force exerted on inserts 25A and 25B, by springs 29 and 30, is large enough to ensure proper lubrication. It should be appreciated, however, that different exerted forces are possible and considered within the scope of the invention. For example, the force can be so large that rolling element 23A cannot rotate due to the friction between rolling element 23A and inserts 25A and 25B. Additionally, the force can be negligible, which would allow rolling element 23A to rotate within main body 21 with negligible friction between rolling element 23A and inserts 25A and 25B.

FIGS. 3A through 3E show insert 25A. Insert 25A broadly includes side 40, top 41, side 42 and bottom 43. Lip 27A protrudes outwardly from side 42 of insert 25A. Lip 27A can be integrally formed with or separately secured to insert 25A. Top 41 and bottom 43 are preferably planar whereas side 40 and side 42 are preferably arcuate. In a preferred embodiment, side 40 is concave and side 42 is convex. Insert 25A is preferably substantially crescent-shaped. However, it should be appreciated insert 25A can take any suitable shape, for example, a semi-circular shape. It should be appreciated that the top plan view of insert 25A is substantially similar to the bottom plan view of insert 25A. Similarly, the right side elevational view of insert 25A is substantially similar to the left side elevational view of insert 25A.

In an example embodiment, the free length of spring 29 or 30 is 0.508 centimeters 0.200 inches) and includes four active coils and a total of six coils with a coilpitch of 0.079 centimeters (0.031 inches) and a rise angle of 2.53 degrees. To achieve efficient lubrication, spring 29 or 30 has a spring constant of 2157.037 Newtons/meter (12.317 pounds (force)/inch (lbF/in)). The max loading that can be applied to spring 29 or 30 is 1.370 Newtons (0.308 lbF) with a safe travel distance of 0.064 centimeters (0.025 inch). Spring 29 or 30, in an example embodiment, has an outer diameter of 0.635 centimeters (0.250 inches and an inner diameter of 0.508 centimeters (0.200 inches). Additionally, the spring wire which forms spring 29 or 30 has a diameter of 0.635 centimeters (0.025 inches).

Figure 4A:
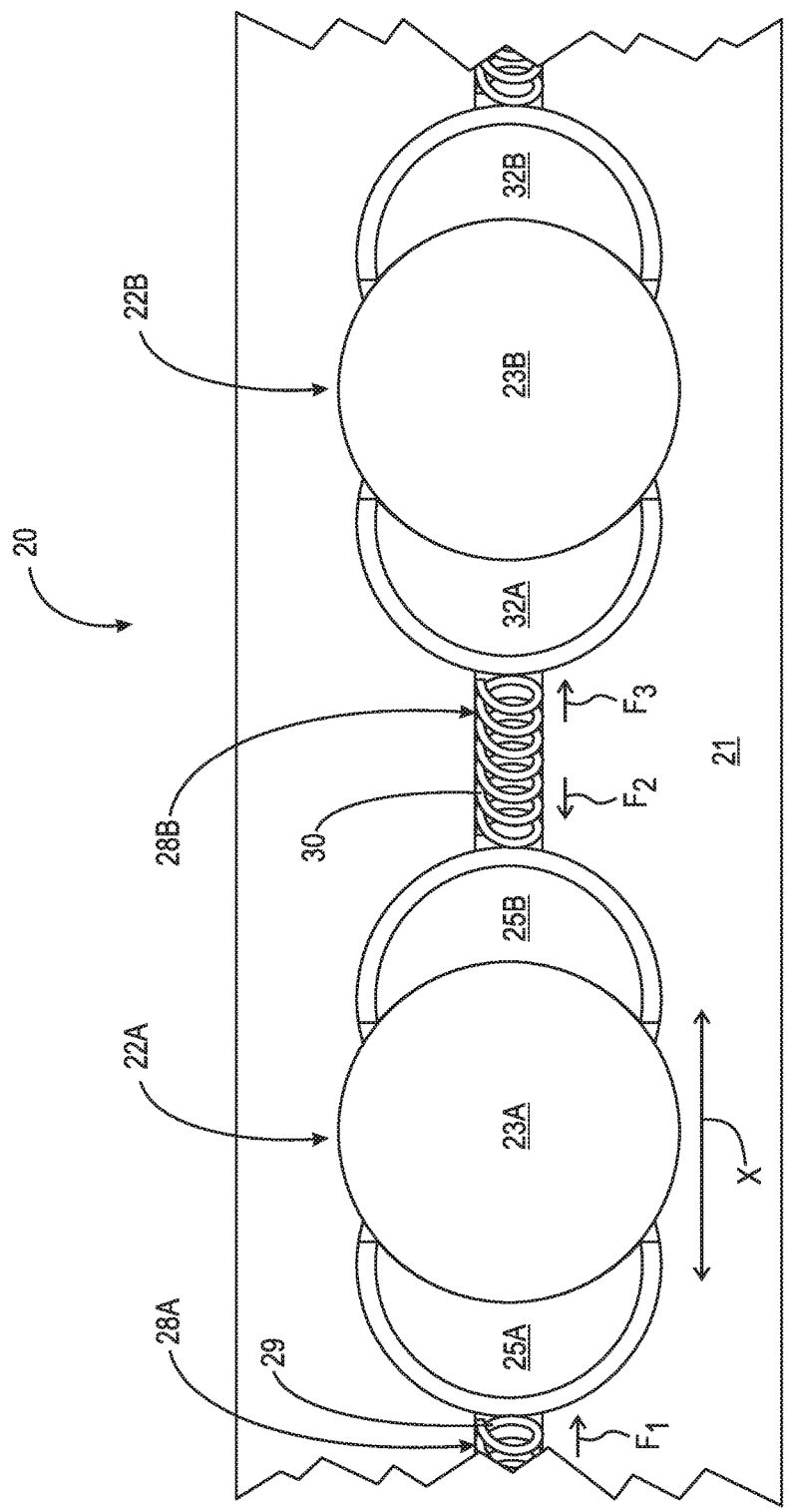
FIG. 4A is a top down cross-sectional view of the cage assembly shown in FIG. 2A taken generally along line 4A-4A in FIG. 2A.

FIG. 4A shows a top down cross-sectional view of cage assembly 20 taken generally along line 4A-4A in FIG. 2A. As shown in FIG. 4A, springs 29 and 30 create axial forces $F_1$, $F_2$, and $F_3$. Spring 29 exerts axial force $F_1$ against insert 25A which causes insert 25A to actively push against rolling element 23A. Thus, as insert 25A erodes, insert 25A is continuously in contact with rolling element 23A. Spring 30 exerts axial force $F_2$ against insert 25B which causes insert 25B to actively push against rolling element 23A. Again, as insert 25B erodes, insert 25B is continuously in contact with rolling element 23A. Similarly, spring 30 exerts axial force $F_3$ against insert 32A which causes insert 32A to actively push against rolling element 23B. Thus, as insert 32A erodes, insert 32A is continuously in contact with rolling element 23B.

Additionally, it should be appreciated that rolling element 23A can move along direction X within pocket 22A (also known as ball excursion) and inserts 25A and 25B and springs 29 and 30 provide a cushioning effect for rolling element 23A within main body 21. Moreover, as insert 25A erodes, rolling element 23A can move further along direction X; thus, inserts 25A and 25B and springs 29 and 30 provide a greater shock absorbing function for main body 21 of cage assembly 20. Furthermore, it should be appreciated that the number of springs can be increased to accommodate varying loads. For example, if desired, insert 25A can be pushed against rolling element 23A by multiple springs.

With the top of main body 21 of cage assembly 20 removed, it should be appreciated that through bore 28B connects sub-pocket 24B of pockets 22A and sub-pocket 31A of pocket 22B. Additionally, it should be appreciated that lip 27A extends along side 42 of insert 25A.

Figure 4B:
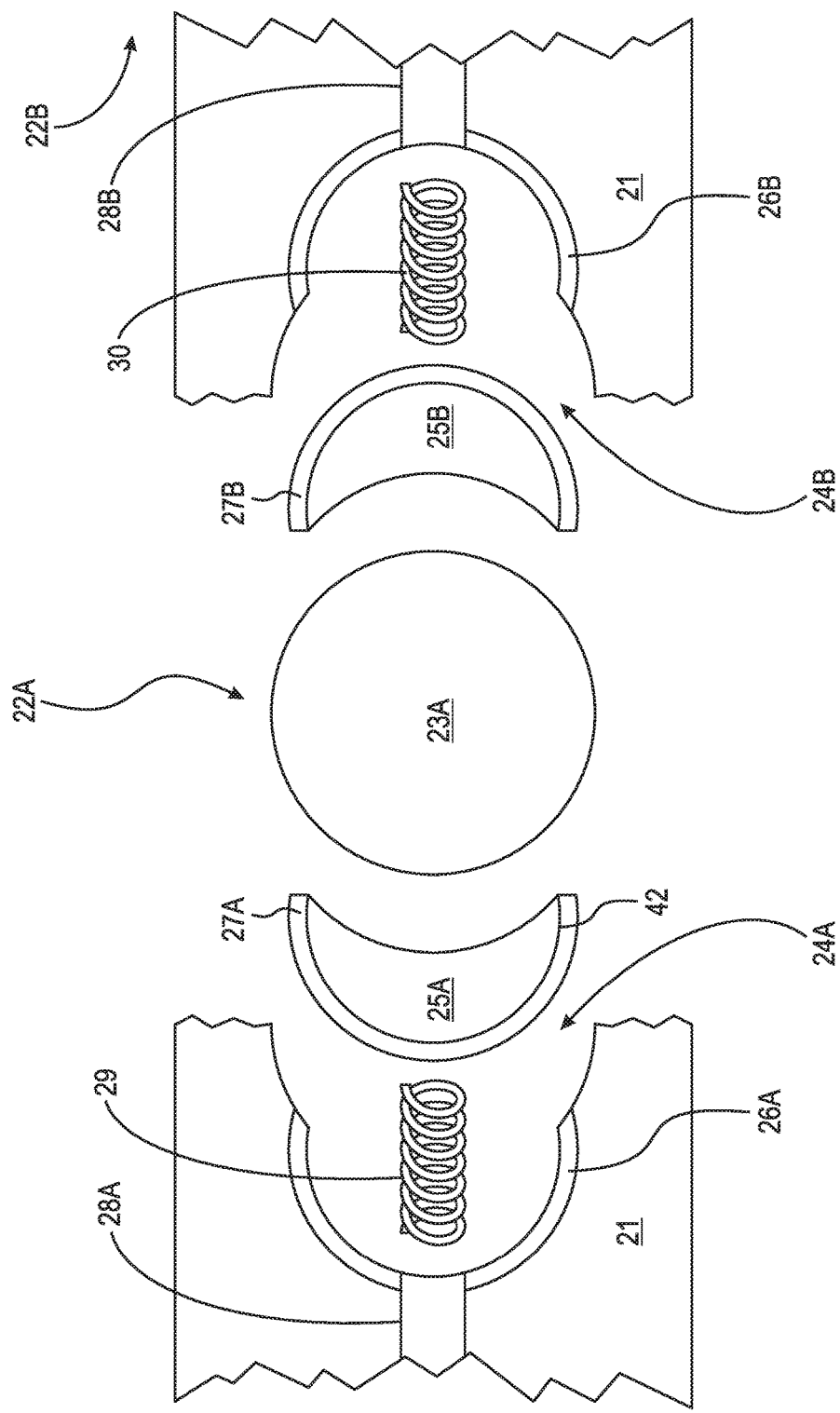
FIG. 4B is a fragmentary exploded view of the cage assembly shown in FIG. 4A.

FIG. 4B shows an exploded view of pocket 22A of cage assembly 20. Sub-pocket 24A is shown along with groove 26A. Lip 27A of insert 25A fits within groove 26A. Through bore 28A extends through groove 26A such that when insert 25A is within sub-pocket 24A the opening of through bore 28A proximate pocket 24A contacts side 42 of insert 25A. This is the case so that when spring 29 is arranged within through bore 28A, the end of spring 29 proximate sub-pocket 24A contacts side 42 of insert 25A.

It should be appreciated that inserts 25A and 25B can be one piece. In a preferred embodiment, inserts 25A and 25B exhibit one degree of freedom within the direction of rotation. Furthermore, it should be appreciated that main body 21 can be made of steel, brass, composite, or molded plastic. Any suitable alternative is contemplated. In a preferred embodiment, to manufacture cage assembly 20 described herein, main body 21 is molded, springs are loaded and compressed, and lubrication elements are inserted in place. Then, rolling elements are placed between the lubrication elements. Once the rolling elements are inserted, the compression on the springs is released thereby allowing the lubrication elements to contact the rolling elements.

Figure 5A:
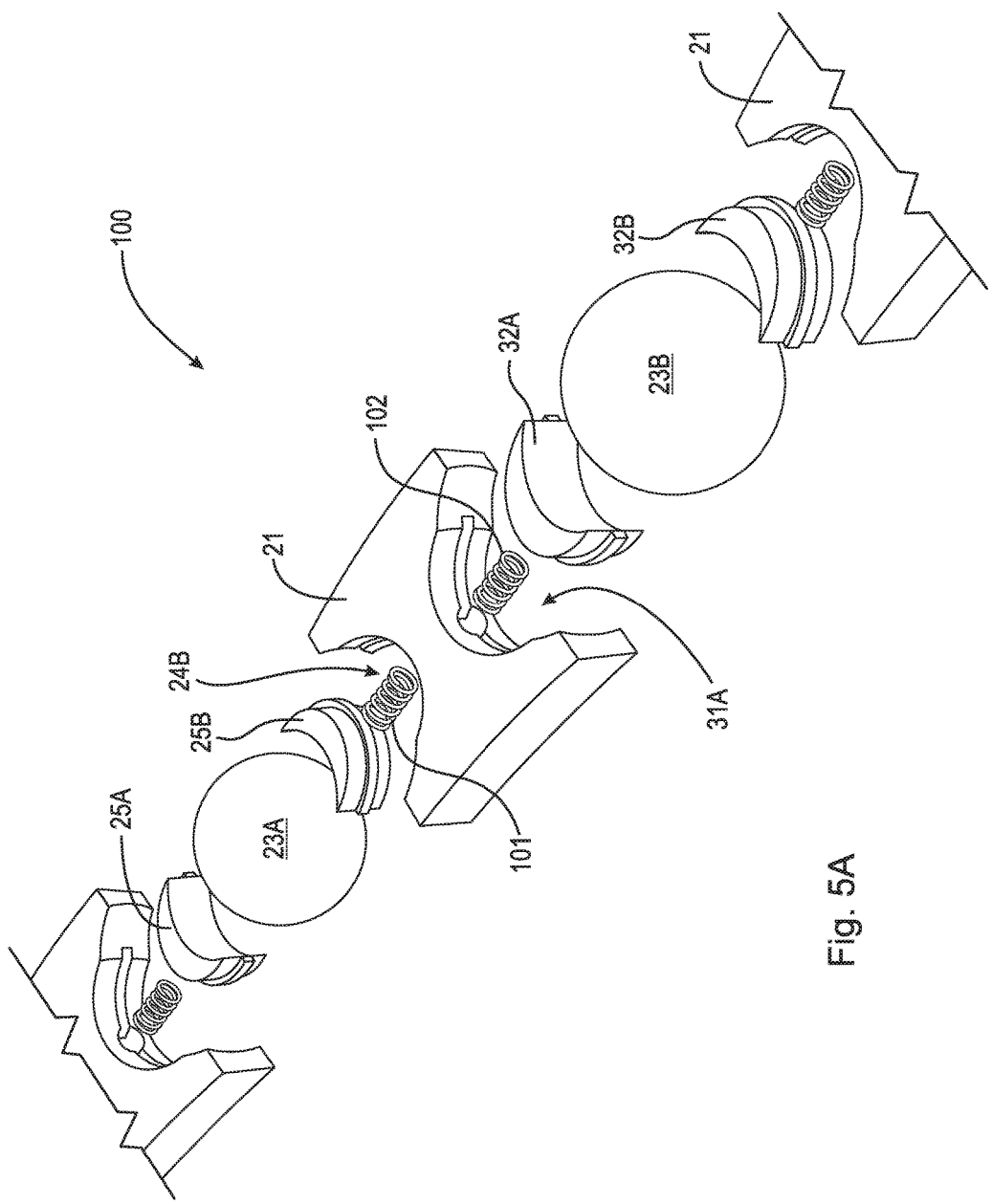
FIG. 5A is an exploded perspective view of an alternate embodiment of the cage assembly of the invention.
Figure 5B:
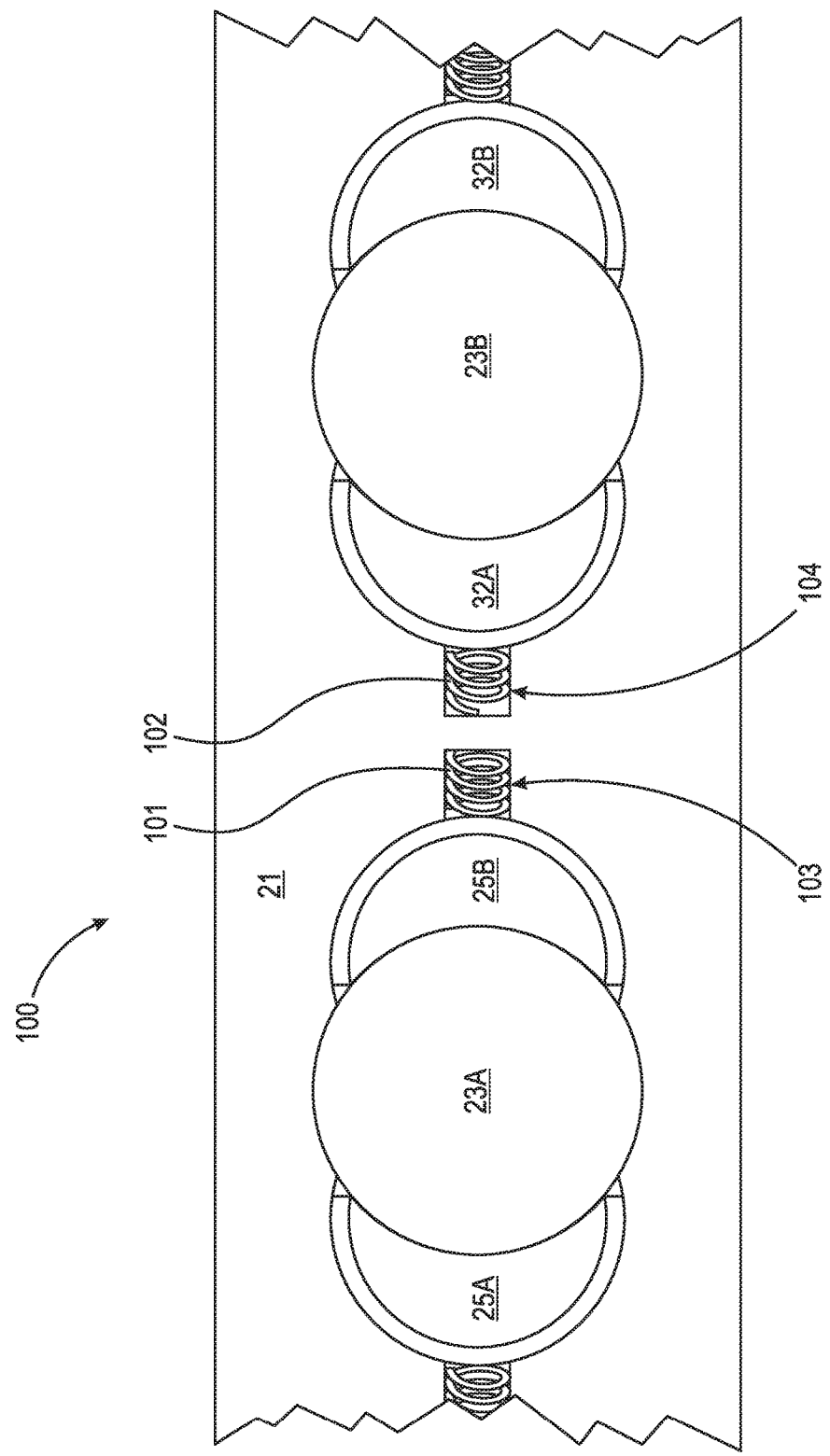
FIG. 5B is a top down cross-sectional view of the embodiment shown in FIG. 5A.

Cage assembly 100 is shown in FIGS. 5A and 5B. The discussion with respect to cage assembly 20 shown in FIGS. 2A through 4B applies to cage assembly 100 shown in FIGS. 5A and 5B except as follows. Instead of a single spring, between sub-pockets 24B and 31A there are two springs 101 and 102. Spring 101 extends between insert 25B and main body 21. Spring 102 extends between insert 32A and main body 21. As shown in FIG. 5B, springs 101 and 102 sit within bores 103 and 104, respectively. Bore 103 is open proximate insert 25B and closed at the opposite end. Similarly, bore 104 is open proximate insert 32A and closed at the opposite end. It should be appreciated that dual springs can be beneficial to the life of the bearing because the springs are not dependent upon effects from the adjacent insert.

Figure 6B:
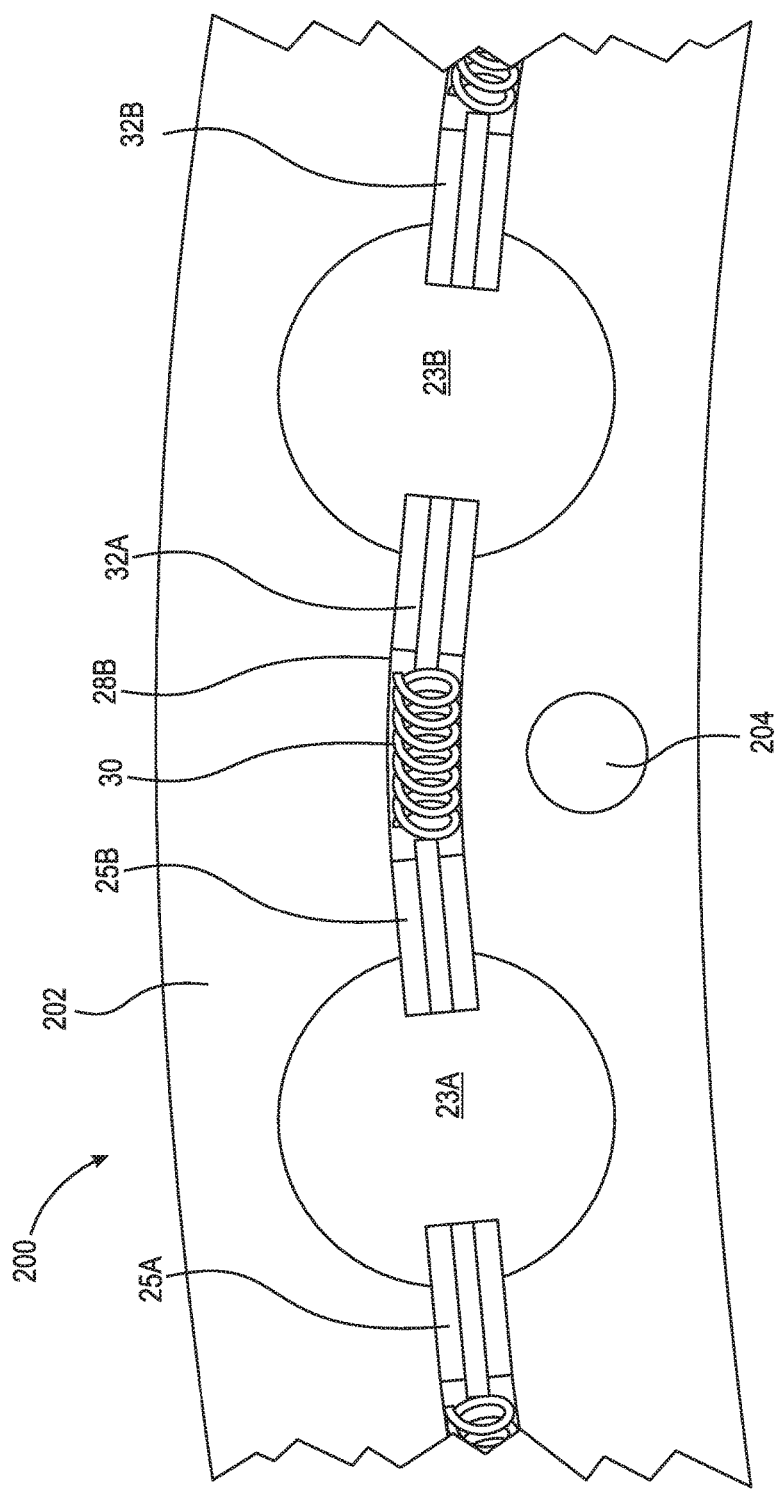
FIG. 6B is a side elevational view of the cage assembly shown in FIG. 6A with one part removed.

Cage assembly 200 is shown in FIGS. 6A and 6B. The discussion with respect to cage assembly 20 shown in FIGS. 2A through 4B applies to cage assembly 200 shown in FIGS. 6A and 6B except as follows. To enhance the accessibility of the internal components, cage assembly 200 can include a two-part main body 201. In the embodiment shown in FIG. 6A, two-part main body 201 includes half 202 and half 203. Axis A extends through through bores 28A and 28B and divides half 202 from half 203. Halves 202 and 203 can be secured by any suitable means. For example, rivets 204 and 205 can be used to secure half 202 to half 203. When two-part main body 201 is not secured, springs 29 and 30 and lubrication elements 25A, 25B, 32A and 32B along with rolling elements 23A and 23B can be replaced. As shown in FIG. 6B (a side view), in a preferred embodiment, rivet 204 is arranged radially inward of through bore 28B and spring 30. However, it should be appreciated that rivets can be arranged in any suitable location to secure half 202 and half 203.

Figure 7A:
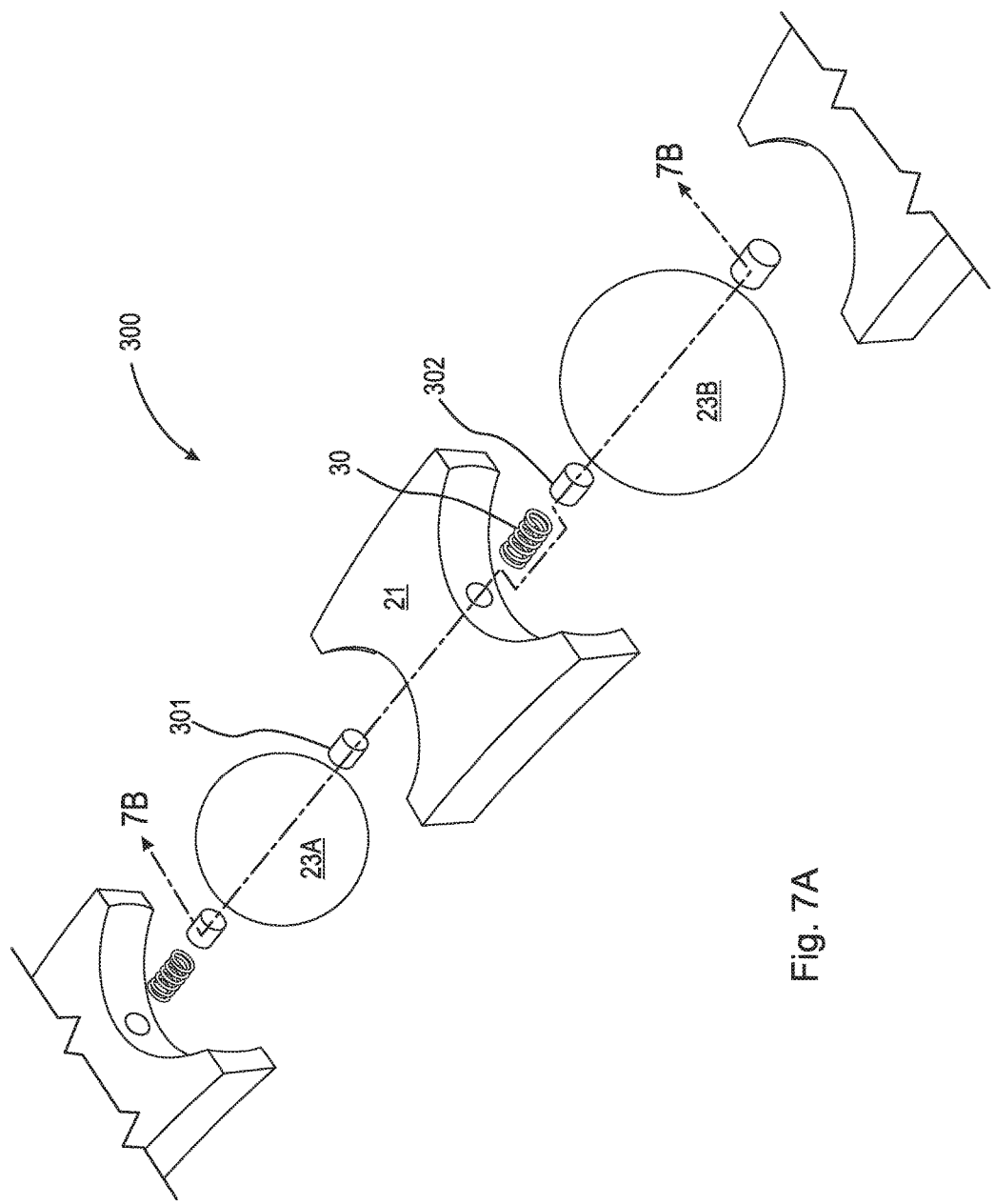
FIG. 7A is a perspective view of yet another embodiment of the cage assembly of the invention.
Figure 7B:
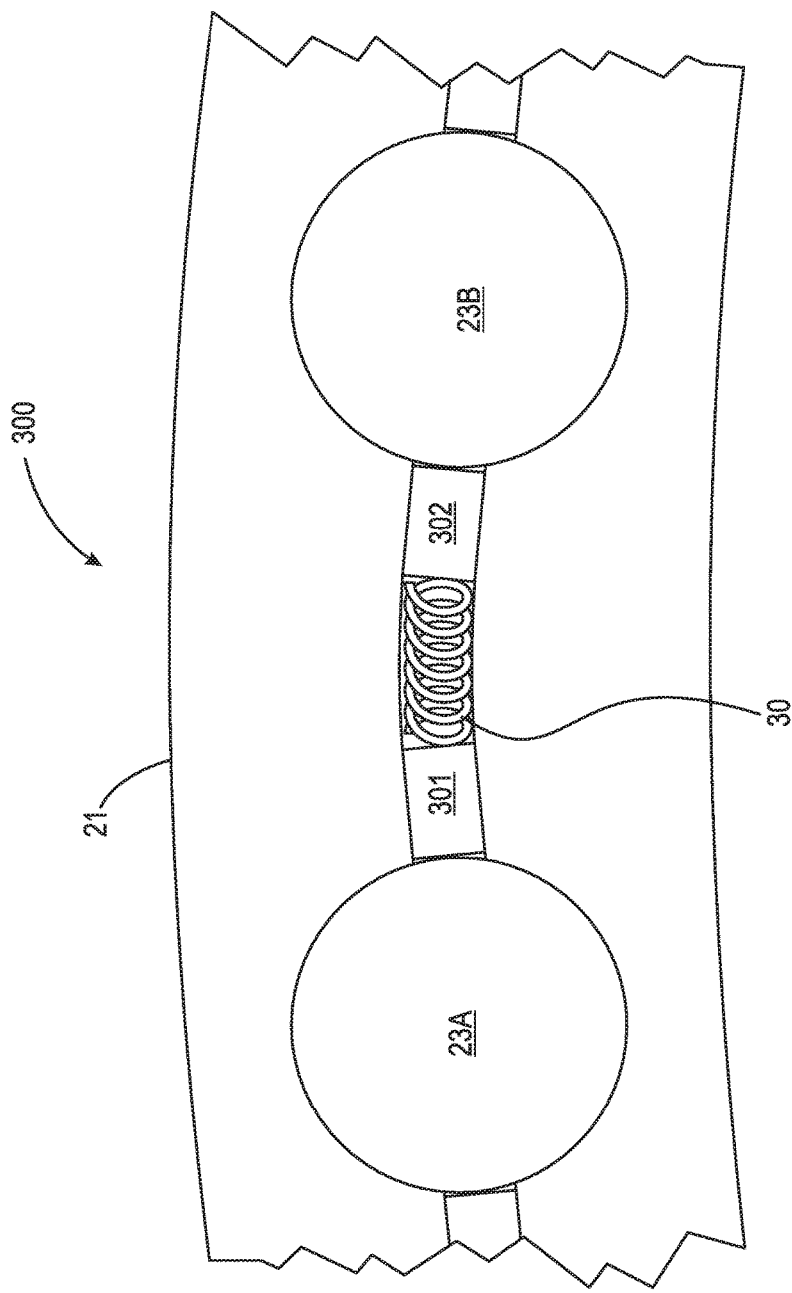
FIG. 7B is a partial cross-section view of the cage assembly shown in FIG. 7A taken generally along line 7B-7B in FIG. 7A.
Figure 7C:
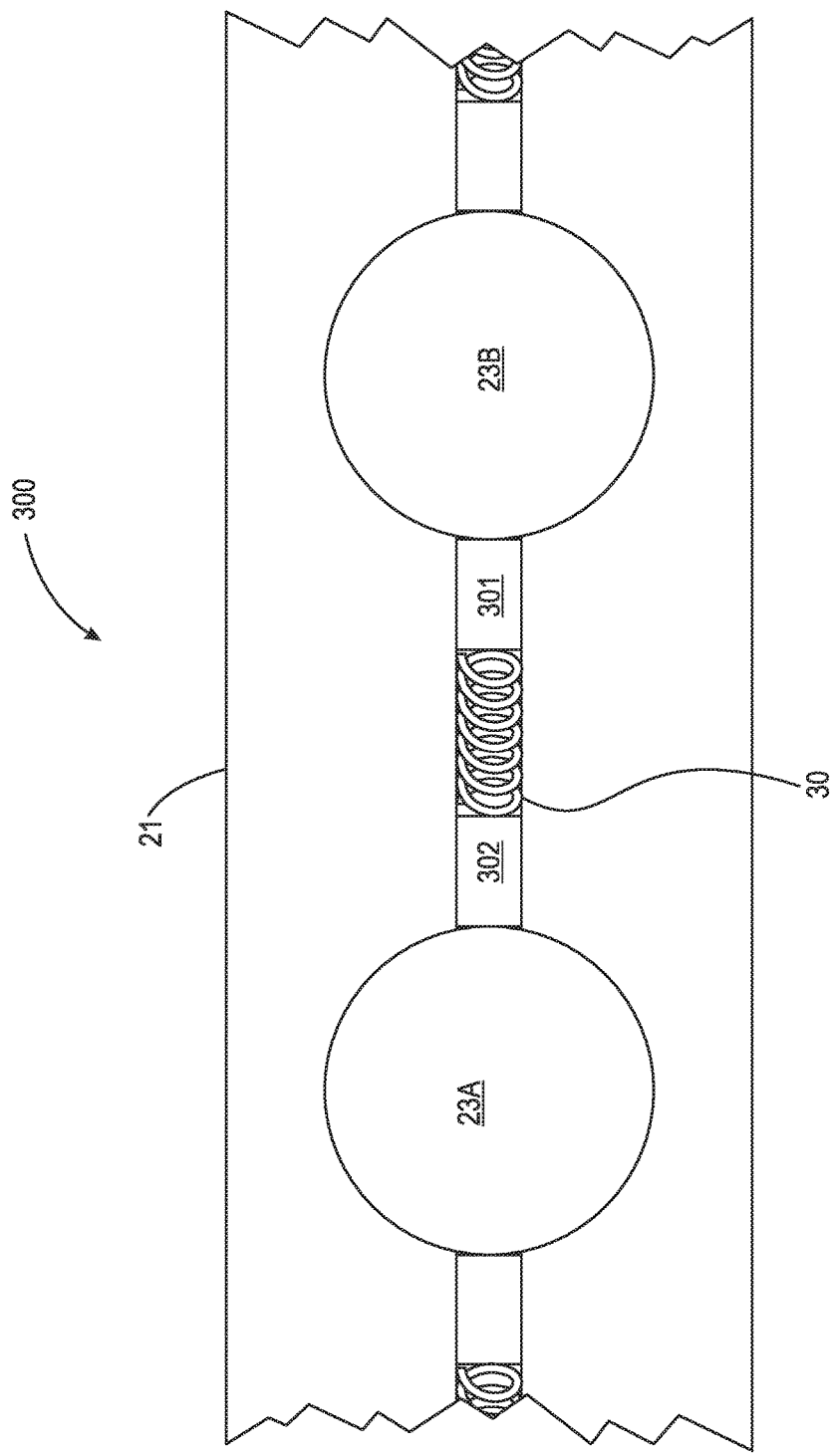
FIG. 7C is a top down view of the cage assembly shown in FIG. 7A except the top portion of the main body of the cage assembly is removed for clarity.

FIGS. 7A through 7C show cage assembly 300. The discussion with respect to cage assembly 20 shown in FIGS. 2A through 4B applies to cage assembly 300 shown in FIGS. 7A through 7C except as follows. Instead of a substantially-crescent shaped lubricating element, insert 301 is a cylindrically-shaped lubricating element. As shown in FIGS. 7B and 7C, between rolling elements 23A and 23B, there is spring 30 surrounded by lubrication elements 301 and 302. Spring 30 is arranged to compress lubrication element 301 so that it actively pushes against rolling element 23A. Similarly, spring 30 is also arranged to compress lubrication element 302 so that it actively pushes against rolling element 23B.

Figure 8:
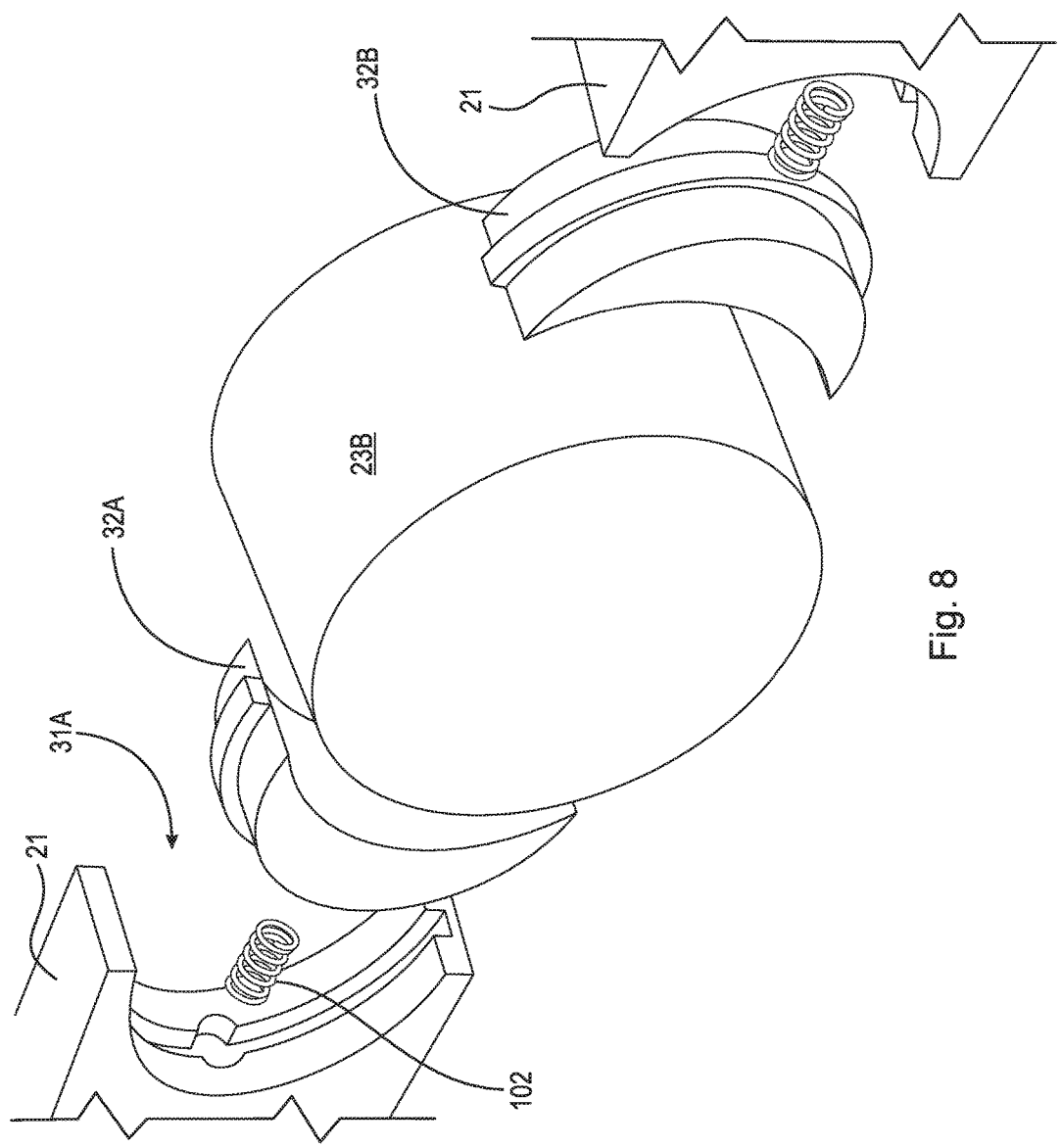
FIG. 8 is an exploded perspective view of an alternate embodiment of the cage assembly of the invention.

Additionally, it should be appreciated that cage assembly 300 can be modified to include the dual spring features of cage assembly 100. Although only spherical rolling elements are depicted herein, cylindrical rolling bodies can be used with the cage assemblies, as shown in FIG. 8. The lubricating inserts can be preloaded against cylindrical rolling bodies by rotating the lubricating inserts 90 degrees from the axis of rotation.

Cage assemblies 20, 100, 200, and 300 are preferably suitable in underwater applications, ovens, desert conditions, in optical equipment, and cryogenic applications. Additionally, it should be appreciated that the cage assembly of the invention could include a plurality of rolling elements, each rolling element having only a single lubrication element pressed against it by a single pre-load member. Diametrically opposed to the single lubrication element, the rolling element can be maintained by a metal insert or any suitable alternative which does not erode.

It will be appreciated that various aspects of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A cage assembly for a bearing, comprising:
   a main body, said main body having a plurality of pockets arranged circumferentially about said main body, each of said pockets operatively arranged to hold one of a plurality of rolling elements, said main body including a plurality of holes, each of said holes operatively arranged to accommodate one of a plurality of pre-load members; and,
   a plurality of lubrication elements, each of said lubrication elements retained within a pocket of said plurality of pockets and operatively arranged to contact one of the plurality of rolling elements;
   wherein each of the plurality of pre-load members compresses at least a respective one of the plurality of lubrication elements.

2. The cage assembly recited in claim 1, wherein the plurality of pre-load members are arranged within said main body and operatively arranged to compress said plurality of lubrication elements against said plurality of rolling elements.

3. The cage assembly recited in claim 2, wherein said plurality of pre-load members is a plurality of springs.

4. The cage assembly recited in claim 2, wherein two of said plurality of pre-load members surround one of said plurality of rolling elements and are diametrically opposed.

5. The cage assembly recited in claim 1, wherein said plurality of holes are through-bores and each of the plurality of pre-load members compresses two of the plurality of lubrication elements.

6. The cage assembly recited in claim 1, wherein said plurality of holes are partial through-bores and each of the plurality of pre-load members compresses one of the plurality of lubrication elements.

7. The cage assembly recited in claim 1, wherein two of said plurality of lubrication elements are retained within a pocket of said plurality of pockets, surround one of said rolling elements, and are diametrically opposed.

8. The cage assembly recited in claim 1, wherein said plurality of lubrication elements are made of a material selected from the group consisting of molybdenum disulfide, graphite, polytetrafluoroethylene and a polyamide-imide polymer.

9. The cage assembly recited in claim 1, wherein each of said plurality of rolling elements is spherical.

10. The cage assembly recited in claim 1, wherein each of said plurality of rolling elements is cylindrical.

11. The cage assembly recited in claim 1, wherein each rolling element is surrounded by two lubrication elements.

12. The cage assembly recited in claim 1, wherein said lubrication elements are substantially crescent-shaped.

13. A cage assembly for a bearing, comprising:
    a main body having a plurality of pockets arranged therein, each of said pockets operatively arranged to hold one of a plurality of rolling elements, said main body including a plurality of holes;
    a plurality of first lubrication elements retained within said main body and operatively arranged to contact said rolling elements;
    a plurality of second lubrication elements substantially similar to said first lubrication elements retained within said main body and operatively arranged to contact said rolling elements, wherein said lubrication elements that surround one of said rolling elements are diametrically opposed; and,
    a plurality of pre-load members, each of said pre-load members arranged within one of said plurality of holes to compress said first and second pluralities of lubrication elements against said rolling elements.

14. The cage assembly recited in claim 13, wherein said pre-load members are springs.

15. The cage assembly recited in claim 13, wherein said plurality of holes are through-bores and each pre-load member compresses two lubrication elements.

16. The cage assembly recited in claim 13, wherein said plurality of holes are partial through-bores and each pre-load member compresses one lubrication element.

17. The cage assembly recited in claim 13, wherein said lubrication elements are made of a material selected from the group consisting molybdenum disulfide, graphite, polytetrafluoroethylene, and a polyamide-imide polymer.

18. The cage assembly recited in claim 13, wherein said rolling elements are spherical.

19. The cage assembly recited in claim 13, wherein said rolling elements are cylindrical.

20. A bearing, comprising:
    an inner ring;
    an outer ring; and,
    a cage assembly arranged between said inner and outer rings, said cage assembly comprising:
      a main body having a plurality of pockets arranged therein, each of said pockets operatively arranged to hold one of a plurality of rolling elements, said main body including a plurality of holes;
      a plurality of first lubrication elements retained within said main body and operatively arranged to contact said rolling elements;
      a plurality of second lubrication elements substantially similar to said first lubrication elements retained within said main body to contact said rolling elements; and,
      a plurality of pre-load members, each of said pre-load members arranged within one of said plurality of holes to compress said first and second pluralities of lubrication elements against said rolling elements.

* * * * *